(12) United States Patent
Mizuno et al.

(10) Patent No.: US 10,978,740 B2
(45) Date of Patent: Apr. 13, 2021

(54) ELECTROLYTE SOLUTION AND LITHIUM ION SECONDARY BATTERY PROVIDED WITH SAME

(71) Applicant: NIPPON SHOKUBAI CO., LTD., Osaka (JP)

(72) Inventors: Hiroyuki Mizuno, Osaka (JP); Kazuhisa Hirata, Osaka (JP); Takeo Kawase, Osaka (JP); Izuho Okada, Osaka (JP); Hiromoto Katsuyama, Osaka (JP); Miwako Tominaga, Osaka (JP); Masayuki Okajima, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 14/768,273

(22) PCT Filed: Feb. 18, 2014

(86) PCT No.: PCT/JP2014/053752
§ 371 (c)(1),
(2) Date: Aug. 17, 2015

(87) PCT Pub. No.: WO2014/126256
PCT Pub. Date: Aug. 21, 2014

(65) Prior Publication Data
US 2015/0380768 A1    Dec. 31, 2015

(30) Foreign Application Priority Data

Feb. 18, 2013  (JP) ............................. JP2013-029274
Sep. 11, 2013  (JP) ............................. JP2013-188802

(51) Int. Cl.
*H01M 10/05* (2010.01)
*H01M 10/0568* (2010.01)
*H01M 10/0569* (2010.01)
*H01M 10/0525* (2010.01)

(52) U.S. Cl.
CPC ... *H01M 10/0568* (2013.01); *H01M 10/0569* (2013.01); *H01M 10/0525* (2013.01); *H01M 2220/20* (2013.01); *H01M 2220/30* (2013.01); *H01M 2300/0028* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 2010/0285373 A1 | 11/2010 | Horikawa | |
| 2010/0316908 A1* | 12/2010 | Yoshimura | H01M 10/0525 429/207 |
| 2011/0183218 A1* | 7/2011 | Odani | H01M 6/164 429/338 |
| 2012/0212186 A1 | 8/2012 | Fujii et al. | |
| 2012/0316716 A1* | 12/2012 | Odani | H01M 10/0567 701/22 |
| 2013/0052543 A1 | 2/2013 | Ihara et al. | |
| 2013/0224575 A1 | 8/2013 | Kojima et al. | |
| 2013/0330609 A1 | 12/2013 | Sawa et al. | |
| 2013/0330610 A1 | 12/2013 | Shigematsu et al. | |
| 2015/0118579 A1 | 4/2015 | Kondo et al. | |
| 2015/0380768 A1 | 12/2015 | Mizuno et al. | |

FOREIGN PATENT DOCUMENTS

| | | | | |
|---|---|---|---|---|
| CN | 102074734 | * | 5/2011 | .......... H01M 10/052 |
| CN | 102820483 | * | 12/2012 | ........ H01M 10/0567 |
| EP | 2 230 711 | | 9/2010 | |
| EP | 2230711 A1 | * | 9/2010 | ............ H01M 10/40 |
| EP | 2 511 976 | | 10/2012 | |
| JP | 2004-165151 | * | 6/2004 | ............ H01M 10/40 |
| JP | 2011-150958 | | 8/2011 | |
| JP | 2012-174437 | | 9/2012 | |
| JP | 2012-182130 | * | 9/2012 | .......... H01M 10/052 |
| JP | 5121035 | | 11/2012 | |
| JP | 2013-101900 | | 5/2013 | |
| JP | 2013-105643 | | 5/2013 | |
| JP | 2013-145731 | | 7/2013 | |
| JP | 2013-145732 | | 7/2013 | |
| JP | 2013-251066 | | 12/2013 | |

(Continued)

OTHER PUBLICATIONS

Office Action dated Jul. 19, 2016 in Japanese patent application No. 2015-500340 with English translation.
Extended European Search Report dated Aug. 23, 2016 in European patent application No. 14751453.
Inc Targray: "Product Data Sheet Electrolyte Solution—Standard Products List", Feb. 20, 2013.
International Search Report dated May 13, 2014 in International Application No. PCT/JP2014/053752.
Office Action dated Aug. 30, 2016 in corresponding Chinese patent application No. 201480008985.0 with English translation.
Chinese Office Action dated Mar. 31, 2017 in corresponding Chinese patent application No. 201480008985.0, with English translation.

(Continued)

*Primary Examiner* — Maria Laios
*Assistant Examiner* — Angela J Martin
(74) *Attorney, Agent, or Firm* — Maschoff Brennan (57) ABSTRACT

The objective of the present invention is to provide an electrolyte solution of which electrolyte salt concentration is high and by which cycle characteristics hardly deteriorate and battery lifetime can be extended, and a lithium ion secondary battery which contains the above electrolyte solution. The electrolyte solution of the present invention comprises an electrolyte salt and a solvent, wherein a concentration of the electrolyte salt is more than 1.1 mol/L, the electrolyte salt contains a compound represented by the following formula (1): $(XSO_2)(FSO_2)NLi$ (1) (wherein X is a fluorine atom, a $C_{1-6}$ alkyl group or a $C_{1-6}$ fluoroalkyl group), and the solvent contains a cyclic carbonate.

10 Claims, 1 Drawing Sheet

(56) References Cited

FOREIGN PATENT DOCUMENTS

JP          2014-13704     1/2014
JP          2014-72071     4/2014
JP            6078629      2/2017

OTHER PUBLICATIONS

Office Action dated Nov. 28, 2017 in corresponding Japanese patent application No. 2017-004509, with English translation.
Communication pursuant to Article 94(3) EPC dated Feb. 21, 2018 in European Patent Application No. 14 751 453.3.
Office Action dated Mar. 28, 2019 in corresponding European patent application No. 14751453.3.
Shung-Ik Lee et al., "A Study of Electrochemical Kinetics of Lithium Ion in Organic Electrolytes", Korean Journal of Chemical Engineering, vol. 19, No. 4, Jul. 31, 2002, pp. 638-644.
Office Action dated Aug. 29, 2018 in corresponding European patent application No. 14 751 453.3-1103.

\* cited by examiner

ELECTROLYTE SOLUTION AND LITHIUM ION SECONDARY BATTERY PROVIDED WITH SAME

TECHNICAL FIELD

The present invention relates to an electrolyte solution and a lithium ion secondary battery which is provided with the electrolyte solution.

BACKGROUND ART

A battery such as a lithium ion secondary battery is used as an electrical power source for a mobile phone, a personal computer, an automobile and the like. With respect to such a battery used for the above application, various studies have been done in order to improve the properties of the battery. Such properties are exemplified by safety and cycle characteristics.

For example, Patent Document 1 discloses an electrolyte solution obtained by dissolving bis(fluorosulfonyl)imide lithium, i.e. LiFSI, and hexafluorolithium as electrolyte salts in a total concentration of 1.1 mole/L and a halogenated carbonate ester such as 4-fluoro-1,3-dioxolan-2-one, i.e. FEC, in a mixed solvent consisting of ethylene carbonate and dimethyl carbonate. It is described in Patent Document 1 that cycle characteristics under low temperature and high temperature can be improved by using LiFSI and a halogenated carbonate ester in combination and adjusting a concentration of LiFSI to 0.001 mol/L-0.5 mol/L.

PRIOR ART DOCUMENT

Patent Document

Patent Document 1: JP 2011-150958 A

DISCLOSURE OF THE INVENTION

Problems to be Solved by the Invention

As the above description, an invention by which cycle characteristics are improved under the condition that a concentration of an electrolyte salt is not more than 1.1 mol/L has been developed. However, an invention by which battery property such as cycle characteristics are improved even under the condition that a concentration of an electrolyte salt is high as more than 1.1 mol/L has not been developed.

Under the above-described circumstance, the objective of the present invention is to provide an electrolyte solution of which electrolyte salt concentration is high and by which cycle characteristics hardly deteriorate and battery lifetime can be extended. In addition, the objective of the present invention is to provide a lithium ion secondary battery which contains the above electrolyte solution.

Means for Solving the Problems

The electrolyte solution according to the present invention which can achieve the above-described objective is characterized in
comprising an electrolyte salt and a solvent,
wherein a concentration of the electrolyte salt is more than 1.1 mol/L,
the electrolyte salt contains a compound represented by the following formula (1):

$$(XSO_2)(FSO_2)NLi \qquad (1)$$

wherein X is a fluorine atom, a $C_{1-4}$ alkyl group or a $C_{1-6}$ fluoroalkyl group,
and the solvent contains a cyclic carbonate.

The electrolyte solution according to the present invention preferably further comprises at least one compound selected from the group consisting of a compound represented by the following formula (2), a compound represented by the following formula (3) and lithium hexafluoroarsenate as the electrolyte salt.

$$LiPF_a(C_nF_{2n+1})_{6-a} \quad (0 \le a \le 6, 1 \le m \le 4) \qquad (2)$$

$$LiBF_b(C_nF_{2n+1})_{4-b} \quad (0 \le b \le 4, 1 \le n \le 4) \qquad (3)$$

In addition, it is preferred in the present invention that a molar ratio of the cyclic carbonate to the total lithium ion in the electrolyte solution, i.e. "cyclic carbonate/$Li^+$", is not less than 1 and not more than 3.

The present invention also relates to a lithium ion secondary battery, comprising the above-described electrolyte solution. It is preferred that an average discharge voltage or the lithium ion secondary battery is not less than 3.7 V.

Effect of the Invention

According to the present invention, it becomes possible to provide an electrolyte solution of which electrolyte salt concentration is high as more than 1.1 mol/L and by which cycle characteristics hardly deteriorate and battery lifetime can be extended, and a lithium ion secondary battery which contains the electrolyte solution.

MODE FOR CARRYING OUT THE INVENTION

1. Electrolyte Solution

The electrolyte solution according to the present invention which can achieve the above-described objective is characterized in
comprising an electrolyte salt and a solvent,
wherein a concentration of the electrolyte salt is more than 1.1 mol/L,
the electrolyte salt contains a compound represented by the following formula (1):

$$(XSO_2)(FSO_2)NLi \qquad (1)$$

wherein X is a fluorine atom, a $C_{1-6}$ alkyl group or a $C_{1-6}$ fluoroalkyl group,
and the solvent contains a cyclic carbonate.

Hereinafter, the above compound represented by the formula (1) is referred to as Electrolyte salt (1).

The concentration of the electrolyte salt in the electrolyte solution according to the present invention exceeds 1.1 mol/L. When an electrolyte salt concentration is high, an amount of ion in an electrolyte solution is also large. It therefore can be thought that when a concentration of an electrolyte salt is high, battery performance is improved since an ion conductivity is increased. However, when an electrolyte salt concentration is high, an ion conductivity is actually decreased since a viscosity of an electrolyte solution is also increased. In the past, an electrolyte salt had been therefore used in a concentration of about 1.0 mol/L.

On the one hand, the present inventors found from an investigation that when the electrolyte salt represented by the above formula (1) is contained in an electrolyte solution, an ion conductivity hardly tends to be decreased and a cycle characteristics do not deteriorate even in a high electrolyte salt concentration of more than 1.1 mol/L. As a result, the present inventors completed the present invention.

In the present invention, a concentration of the electrolyte salt is preferably not less than 1.2 mol/L, more preferably not less than 1.25 mol/L, even more preferably not less than 1.3 mol/L, and preferably not more than 2.0 mol/L, more preferably not more than 1.9 mol/L, even more preferably not more than 1.8 mol/L. When the electrolyte salt concentration is excessively high, a viscosity of the electrolyte solution may be overly increased, an ion conductivity may be lowered and battery performance such as discharge rate characteristics may possibly deteriorate. On the one hand, when the electrolyte salt concentration is excessively low, an amount of ion in the electrolyte solution is decreased; as a result, an ion conductivity may be lowered and a desired battery performance may not be possibly provided. In the present invention, even when the electrolyte salt concentration is adjusted to more than 1.1 mol/L, an ion conductivity is hardly decreased. The following points may be given as the reasons:

the solubility of Electrolyte salt (1) as one of the electrolyte salts in the solvent is very high in comparison with other electrolyte salts such as $LiPF_4$;

the viscosity of the electrolyte solution is hardly increased by Electrolyte salt (1); and Electrolyte salt (1) is excellent in an ion conductivity.

Hereinafter, the electrolyte solution of the present invention is described in more detail.

1-1. Electrolyte Salt 1-1-1. Electrolyte Salt (1)

The electrolyte solution of the present invention contains the electrolyte salt represented by the above-described formula (1). The Electrolyte salt (1) is reacted with a positive electrode and/or a negative electrode at the time of the battery-drive to form a coating layer on the surface of the electrode. The coating layer effectively inhibits the degradation of the electrolyte solution; as a result, a capacity retention effect and cycle characteristics are stably exhibited without deteriorating the properties of the electrolyte solution. In addition, it is suppressed by the formation of the above coating layer to elute the constituent components of an electrode, such as an electrode active material; as a result, cycle characteristics of the battery can be improved by inhibiting an increase of an internal resistance of the battery to maintain the discharge voltage at high level.

In the general formula (1), 'X' is a fluorine atom, a $C_{1-6}$ alkyl group or a $C_{1-6}$ fluorinated alkyl group. The $C_{1-6}$ alkyl group is preferably a straight-chain alkyl group or a branched-chain alkyl group. For example, the $C_{1-6}$ alkyl group is methyl, ethyl, propyl, isopropyl, butyl, pentyl or hexyl. The $C_{1-6}$ fluorinated alkyl group is exemplified by the above-described alkyl group of which a part of or all of hydrogen atoms are substituted by fluorine atom. For example, the $C_{1-6}$ fluorinated alkyl group is fluoromethyl, difluoromethyl, trifluoromethyl, fluoroethyl, difluoroethyl, trifluoroethyl or pentafluoroethyl. The substituent 'X' is preferably a fluorine atom, a trifluoromethyl or a pentafluoroethyl. The Electrolyte salt (1) is specifically exemplified by lithium bis(fluorosulfonyl)imide, lithium(fluorosulfonyl)(trifluoromethylsulfonyl)imide, lithium(fluorosulfonyl)(methylsulfonyl)imide, lithium(fluorosulfonyl)(pentafluoroethylsulfonyl)imide and lithium(fluorosulfonyl)(ethylsulfonyl)imide, is more preferably lithium bis(fluorosulfonyl)imide, lithium(fluorosulfonyl)(trifluoromethylsulfonyl)imide or lithium(fluorosulfonyl)(pentafluoroethylsulfonyl)imide, and is even more preferably lithium bis(fluorosulfonyl)imide or lithium(fluorosulfonyl)(trifluoromethylsulfonyl)imide.

One of Electrolyte salts (1) may be used alone, or two or more Electrolyte salts (1) may be used in combination. The commercially-available Electrolyte salt (1) may be used, or Electrolyte salt (1) to be used may be synthesized by a conventionally-known method.

The concentration of Electrolyte salt (1) in the electrolyte solution according to the present invention is preferably not less than 0.01 mol/L, more preferably not less than 0.05 mol/L, even more preferably not less than 0.2 mol/L, and preferably not more than 1.8 mol/L, more preferably not more than 1.6 mol/L, even more preferably not more than 1.4 mol/L. When the concentration of Electrolyte salt (1) is excessively high, a positive electrode collector may be possibly corroded. On the one hand, when the concentration is excessively low, the effect by Electrolyte salt (1) may not be possibly exhibited in some cases.

1-1-2. Other Electrolyte Salt

The electrolyte solution of the present invention may contain other electrolyte salt in addition to the above-described Electrolyte salt (1). As another electrolyte salt, conventionally-known electrolyte salt may be used. Such an electrolyte salt is exemplified by an inorganic cation salt and organic cation salt of trifluoromethanesulfonate ion ($CF_3SO_3^-$), hexafluorophosphate ion ($PF_6^-$), perchlorate ion ($ClO_4^-$), tetrafluoroborate ion ($BF_4^-$), hexafluoroarsenate ion ($AsF_6^-$), tetracyanoborate ion ($[B(CN)_4]^-$), tetrachloroaluminum ion ($AlCl_4^-$), tricyanomethide ion ($C[(CN)_2]^-$), dicyanamide ion ($N[(CN)_2]^-$), bis(trifluoromethanesulfonyl)imide ion ($N[(SO_2CF_3)_2]^-$), tris(trifluoromethanesulfonyl)methide ion ($C[(CF_3SO_2)_3]^-$), hexafluoroantimonate ion ($SbF_6^+$) and dicyanotriazolate ion (DCTA) as an anion.

Among the above-described other electrolyte salt, one or more compounds selected from the group consisting of the compound represented by the general formula (2): $LiPF_a(C_aF_{2m+1})_{6-a}$ ($0 \le a \le 6$, $1 \le m \le 4$), the compound represented by the general formula (3): $LiBF_b(C_nF_{2n+1})_{4-b}$ ($0 \le b \le 4$, $1 \le n \le 4$) and lithium hexafluoroarsenate (LiAsF6). When the electrolyte salt is used in combination, the corrosion of a positive electrode collector due to Electrolyte salt (1) is inhibited.

Hereinafter, the compound represented by the general formula (2) is referred to as "Electrolyte salt (2)" in some cases. The Electrolyte salt (2) is preferably exemplified by $LiPF_6$, $LiPF_3(CF_3)_3$, $LiPF_3(C_2F_5)_3$, $LiPF_3(C_3F_7)$ and $LiPF_3(C_4F_9)_{3s}$. The Electrolyte salt (2) is more preferably $LiPF_6$ or $LiPF_3(C_2F_5)_3$, and even more preferably $LiPF_6$.

Hereinafter, the compound represented by the general formula (3) is referred to as "Electrolyte salt (3)" in some cases. The Electrolyte salt (3) is preferably exemplified by $LiBF_4$, $LiBF(CF_3)_3$, $LiBF(C_2F_5)$ and $LiBF(C_3F_7)_3$, more preferably $LiBF_4$ and $LiBF(CF_3)_3$, and even more preferably $LiBF_4$.

As the above other electrolyte salt, one of the exemplified above compounds may be used alone, or two or more exemplified above compounds may be used in combination. The above other electrolyte salt is preferably $LiPF_6$, $LiPF_3(C_2F_5)_3$, $LiBF_4$ or $LiBF(CF_3)_3$, more preferably $LiPF_6$ or $LiBF_4$, and even more preferably $LiPF_6$. In particular, it is preferred to use $LiPF_6$ in addition to Electrolyte salt (1), since good cycle characteristics can be readily obtained even in high electrolyte salt concentration such as more than 1.1 mol/L.

The concentration of the above other electrolyte salt is not particularly limited as long as the total concentration of Electrolyte salt (1) and the above other electrolyte salt is more than 1.1 mol/L. The concentration of the above other electrolyte salt is preferably not less than 0.1 mol/L, more preferably not less than 0.15 mol/L, even more preferably not less than 0.2 mol/L, and preferably not more than 1.5 mol/L, more preferably not more than 1.4 mol/L, even more preferably not more than 1.3 mol/L. When the concentration of the above other electrolyte salt is excessively high, an ion conductivity may be possibly decreased due to increase of viscosity. On the one hand, when the concentration is excessively low, a positive electrode collector may be possibly corroded due to Electrolyte salt (1).

1-2. Solvent

The electrolyte solution of the present invention contains a cyclic carbonate as a solvent. Such a cyclic carbonate is exemplified by a saturated cyclic carbonate such as ethylene carbonate, propylene carbonate, 2,3-dimethylethylene carbonate (i.e. 2,3-butanediyl carbonate), 1,2-butylene carbonate and erythritan carbonate; a cyclic carbonate having a unsaturated bond, such as vinylene carbonate, methylvinylene carbonate (MVC; i.e. 4-methyl-1,3-dioxole-2-one), ethylvinylene carbonate (EVC; i.e. 4-ethyl-1,3-dioxole-2-one), 2-vinylethylene carbonate (i.e. 4-vinyl-1,3-dioxolane-2-one) and phenylethylene carbonate (i.e. 4-phenyl-1,3-dioxolane-2-one); a fluorine-containing cyclic carbonate such as fluoroethylene carbonate, 4,5-difluoroethylene carbonate and trifluoropropylene carbonate; and the like. Among the exemplified solvents, a saturated cyclic carbonate is preferred in terms of cost, and ethylene carbonate and propylene carbonate are particularly preferred. One of cyclic carbonates may be used alone, or two or more cyclic carbonates may be used in combination.

It is preferred to use a cyclic carbonate in a molar ratio of not less than 1 and not more than 5 to a total lithium ion amount contained in the electrolyte solution. The molar ratio is represented as "cyclic carbonate/Li$^+$". When a cyclic carbonate is used in the range of the above molar ratio in the electrolyte solution of the lithium ion secondary battery, deterioration of cycle characteristics can be further inhibited, in other words, life time is extended.

The degradation of a solvent in an electrolyte solution has been known as one of the causes of cycle characteristics deterioration. However, deterioration of cycle characteristics can be further inhibited by adjusting an amount of a cyclic carbonate to be used to lithium ion to the above-described range. The present inventors considers the following matter as the reason why deterioration of cycle characteristics is inhibited. A free cyclic carbonate, which is not solvated with a lithium ion in the electrolyte solution, can be involved in the degradation reaction. An amount of such a free cyclic carbonate in the electrolyte solution is reduced by adjusting a use amount of cyclic carbonate depending on a lithium ion amount; as a result, deterioration of cycle characteristics is inhibited, since degradation reaction of a solvent hardly proceeds due to a reduced amount of a free cyclic carbonate.

When the above-described molar ratio of cyclic carbonate/Li$^+$ is excessively large, a free cyclic carbonate which exists in the electrolyte solution in a large amount may be oxidized and/or reduced to be decomposed; as a result, cycle characteristics may deteriorate. On the one hand, the above-described molar ratio is excessively small, an amount of cyclic carbonate becomes too small. As a result, an effect by cyclic carbonate may not be possibly exerted. As such an effect, for example, a cyclic carbonate prevents the electrolyte solution from being decomposed by forming a coating layer on a negative electrode. In addition, an amount of the electrolyte solution may be possibly deficient due to the consumption of a solvent by a repeat of charge/discharge. For example, a cyclic carbonate forms a coating layer or decomposes by a repeat of charge/discharge. It is therefore preferred to use a cyclic carbonate in a molar ratio to lithium ion, i.e. cyclic carbonate/Li$^+$, of not less than 1 and not more than 4.5, even more preferably not less than 1 and not more than 4.0, even more preferably not less than 1 and not more than 3.0, even more preferably not less than 1 and not more than 2.7, even more preferably not more than 2.5, particularly preferably not more than 2.0, and particularly more preferably not more than 1.8.

The molar ratio of the cyclic carbonate to lithium ion, i.e. cyclic carbonate/Li$^+$, is calculated on the basis of the specific gravity and molar mass of the cyclic carbonate. For example, in a case of ethylene carbonate, the molar ratio can be calculated in the condition that specific gravity is 1.321 and molar mass is 88.06.

The electrolyte solution of the present invention may contain a solvent other than the cyclic carbonate. It is preferred that such another solvent exhibits high dielectric constant, can readily dissolve an electrolyte salt, has a boiling point of not less than 60° C., and is electrochemically stable. The other solvent is more preferably a non-aqueous organic solvent of which water content is small. Such a non-aqueous organic solvent is exemplified by an ether solvent such as ethylene glycol dimethyl ether, (i.e. 1,2-dimethoxyethane), ethylene glycol diethyl ether, tetrahydrofuran, 2-methyltetrahydrofuran, 2,6-dimethyltetrahydrofuran, tetrahydropyran, crown ether, triethylene glycol dimethyl ether, tetraethylene glycol dimethyl ether, 1,4-dioxane and 1,3-dioxolan; a chain carbonate ester solvent such as dimethyl carbonate, ethyl methyl carbonate, diethyl carbonate, diphenyl carbonate and methyl phenyl carbonate; an aliphatic carboxylate ester solvent such as methyl formate, methyl acetate, methyl propionate, ethyl propionate, ethyl acetate, propyl acetate, butyl acetate and amyl acetate; an aromatic carboxylate ester solvent such as methyl benzoate and ethyl benzoate; a lactone solvent such as γ-butyrolactone, γ-valerolactone and δ-valerolactone; a phosphate ester solvent such as trimethyl phosphate, ethyl dimethyl phosphate, diethyl methyl phosphate and triethyl phosphate; a nitrile solvent such as acetonitrile, propionitrile, methoxypropionitrile, glutaronitrile, adiponitrile, 2-methylglutaronitrile, valeronitrile, butyronitrile and isobutyronitrile; an amide solvent such as N-methylformamide, N-ethylformamide, N,N-dimethylformamide, N,N-dimethylacetamide, N-methylpyrrolidinone and N-vinylpyrrolidone; a sulfur compound solvent such as dimethyl sulfone, ethyl methyl sulfone, diethyl sulfone, sulfolane, 3-methylsulfolane and 2,4-dimethylsulfolane; an alcohol solvent such as ethylene glycol, propylene glycol, ethylene glycol monomethyl ether and ethylene glycol monoethyl ether; a sulfoxide solvent such as dimethylsulfoxide, methylethylsulfoxide and diethylsulfoxide; an aromatic nitrile solvent such as benzonitrile and tolunitrile; nitromethane, 1,3-dimethyl-2-imidazolidinone, 1,3-dimethyl-3,4,5,6-tetrahydro-2(1H)-pyrimidinone, 3-methyl-2-oxazolidinone and the like.

Among the exemplified solvents, a chain carbonate ester, an aliphatic carbonate ester solvent, a lactone solvent and an ether solvent are preferred, methyl carbonate, ethyl methyl carbonate, diethyl carbonate, γ-butyrolactone and γ-valerolactone are more preferred. One of the above-described other solvents may be used alone, or two or more other solvents may be used in combination.

An amount of another solvent to be used is preferably not less than 50 vol % to 100 vol % which corresponds to total of the cyclic carbonate and the other solvent, more preferably not less than 55 vol %, even more preferably not less than 60 vol %, and preferably not more than 99 vol %, more preferably not more than 95 vol %, even more preferably not more than 90 vol %.

1-3. Other Component

The electrolyte solution of the present invention may contain an additive agent in order to improve various properties of the battery.

An additive agent is exemplified by a carboxylic acid anhydride such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride and phenylsuccinic anhydride; a sulfur-containing compound such as ethylene sulfite, 1,3-propanesultone, 1,4-butanesultone, methyl methanesulfonate, busulphan, sulfolane, sulfolene, dimethyl sulfone and tetramethylthiuram monosulfide; a nitrogen-containing compound such as 1-methyl-2-pyrrolidinone, 1-methyl-2-piperidone, 3-methyl-2-oxazolidinone, 1,3-dimethyl-2-imidazolidinone and N-methylsuccinimide; a phosphate such as monofluorophosphate and difluorophosphate; a saturated hydrocarbon compound such as heptane, octane and cycloheptane; a unsaturated hydrocarbon compound such as biphenyl, alkylbiphenyl, terphenyl, partially hydrogenated terphenyl, cyclohexylbenzene, t-butylbenzene, t-amylbenzene, diphenylether and dibenzofuran; and the like.

It is preferred to use the above-described additive agent in a concentration in the electrolyte solution of not less than 0.1 mass %, more preferably not less than 0.2 mass %, even more preferably not less than 0.3 mass %, and not more than 20 mass %, more preferably not more than 15 mass %, more preferably not more than 10 mass %, even more preferably not more than 8 mass %, even more preferably not more than 5 mass %. When the amount of the additive agent to be used is too small, the effect by the additive agent may not be possibly exhibited in some cases. On the one hand, even if too much amount of the additive agent is used, an effect equivalent of the used amount may not be possibly exhibited and an adverse impact may be generated on cell properties due to degradation of the excessive additive agent, adsorption to an electrode or a separator, and a reaction such as polymerization.

2. Lithium Ion Secondary Battery

The lithium ion secondary battery of the present invention is characterized in comprising a positive electrode, a negative electrode and the electrolyte solution of the present invention as an electrolyte solution. In more detail, a separator is placed between the above-described positive electrode and negative electrode, and the electrolyte solution of the present invention is contained in an outer packaging case with the positive electrode, negative electrode and other component while the separator is impregnated with the electrolyte solution.

The figure of the lithium ion secondary battery according to the present invention is not particularly restricted and may be any figures which are conventionally known as a figure of a lithium secondary battery, such as cylinder type, square type, laminate type, coin type and large size. When the battery is used as a high-voltage supply of several dozen volt to several hundred volt for a battery vehicle, a hybrid electric vehicle and the like, the batteries are connected in series to be a cell module.

An average discharge voltage of the lithium ion secondary battery according to the present invention is preferably not less than 3.7 V. The average discharge voltage is preferably not more than 5.0 V, more preferably not less than 3.75 V and not more than 4.95 V, and even more preferably not less than 3.8 V and not more than 4.9 V. An energy density of a cell becomes higher with increasing the value of an average discharge voltage. In the present invention, the average discharge voltage is measured using a charge/discharge device. In more detail, the average discharge voltage is measured at the first discharge, and means a voltage of the lithium ion secondary battery which voltage is measured by fully charging the lithium ion secondary battery, discharging the battery with a current of 0.2 C for completing the discharge for 5 hours, and measuring the voltage value 150 minutes after from the discharge starting time.

2-1. Positive Electrode

The positive electrode is prepared by supporting a positive electrode compound composition which contains a positive electrode active material, a conductive auxiliary agent and a binder on a positive electrode collector. The positive electrode is generally formed into a sheet.

As a method for producing the positive electrode is exemplified as follows:

a method in which a positive electrode collector is coated with a positive electrode active material composition prepared by dissolving or dispersing a positive electrode compound composition in a dispersion solvent by a doctor blade method and the like, or a positive electrode collector is immersed in a positive electrode active material composition, and then dried;

a method in which a positive electrode active material composition is mixed, formed into a sheet and dried, the sheet is bonded on a positive electrode collector using an electrically-conductive adhesive, and the obtained bonded body is pressed and dried;

a method in which a positive electrode active material composition containing a liquid lubricant is applied or casted on a positive electrode collector, the coated collector is formed into a desired shape, the liquid lubricant is removed, and then the collector is drawn uniaxially or in multi-axis directions.

2-1-1. Positive Electrode Collector

A raw material for a positive electrode collector is not particularly restricted, and an electrically-conductive metal such as aluminum, aluminum alloy and titanium can be used as the raw material. Among the exemplified metals, aluminum is preferred, since aluminum can be readily formed into a thin film and is inexpensive.

2-1-2. Positive Electrode Active Material

A positive electrode active material can store and discharge a lithium ion, and a positive electrode active material which is conventionally known for a lithium ion secondary battery can be used.

Specifically, the positive electrode active material is exemplified by a transition metal oxide such as lithium cobaltate, lithium nickelate, lithium manganate, $LiNi_{0.5}Mn_{1.5}O_4$, which is obtained by substituting a part of $LiMn_1O_4$ type oxide with Ni, a ternary oxide represented by $LiNi_{1-x-y}Co_xMn_yO_2$ and $LiNi_{1-x-y}Co_xAl_yO_2$ ($0<x<1$, $0<y<1$, $0<x+y<1$); a compound having an olivine structure, such as $LiAPO_4$ (A=Fe, Mn, Ni, Co); a solid solution material into which two or more transition metals are incorporated, such as a solid solution compound of electrochemically inactive laminar $Li_2MnO_3$ and electrochemically active laminar LiM'O [M'=a transition metal such as Co and Ni]. One of the positive electrode active materials may be used alone, or two or more positive electrode active materials may be used in combination.

An amount of the positive electrode active material to be used is preferably not less than 75 parts by mass and not more than 99 parts by mass, and more preferably not less than 85 parts by mass and not more than 97 parts by mass, to 100 parts by mass of the total positive electrode compound composition.

2-1-3. Conductive Auxiliary Agent

The conductive auxiliary agent is used in order to obtain high output of the lithium ion secondary battery. As the conductive auxiliary agent, a conductive carbon is mainly used. Such a conductive carbon is exemplified by acetylene black, carbon black, graphite, fullerene, metal powder material, a single-walled nanotube, a multi-walled nanotube and vapor grown carbon fiber.

When the conductive auxiliary agent is used, a content amount of the conductive auxiliary agent in the positive electrode compound composition is preferably not less than 0.1 mass % and not more than 10 mass % to 100 mass % of the positive electrode compound composition. The content amount is more preferably not less than 0.5 mass % and not more than 10 mass %, and even more preferably not less than 1 mass % and not more than 10 mass %. When the amount of the conductive auxiliary agent is too small, load characteristics and discharge capacity may possibly deteriorate by extremely lowering conductivity. On the one hand, too large content amount is not preferred, since a bulk density of positive electrode compound composition layer may be increased, and as a result, a content amount of the binder should be further increased.

2-1-4. Binder

The binder is exemplified by a fluororesin such as polyvinylidene difluoride and polytetrafluoroethylene; a synthetic rubber such as styrene-butadiene rubber, nitrile butadiene rubber, methyl methacrylate-butadiene rubber and chloroprene rubber; polyamide resin such as polyamide-imide; polyolefin resin such as polyethylene and polypropylene; poly(meth)acrylate resin such as polyacrylamide and polymethylmethacrylate; polyacrylic acid; a cellulose resin such as methylcellulose, ethylcellulose, triethylcellulose, carboxymethylcellulose and aminoethylcellulose; a vinyl alcohol resin such as ethylene vinyl alcohol and polyvinyl alcohol. One of the binders may be used alone, or two or more binders may be used in combination. When the positive electrode is prepared, the binder may be dissolved or dispersed in a solvent.

When the binder is used, a content amount of the binder in the positive electrode compound composition is not less than 0.1 mass % and not more than 10 mass % to 100 mass % of the positive electrode compound composition. The content amount is more preferably not less than 0.5 mass % and not more than 10 mass %, and even more preferably not less than 1 mass % and not more than 10 mass %. When the amount of the binder is too small, good adhesiveness may not be obtained, and as a result, the positive electrode active material or conductive auxiliary agent may be possibly separated from the collector. On the one hand, too large amount of the binder may possibly have a bad effect on a cell property; for example, internal resistance may be increased.

A content amount of the conductive auxiliary agent and binder may be appropriately adjusted in terms of ion conductivity and intended purpose of the cell; for example, depending on whether output or energy is important.

When the positive electrode is prepared, a solvent for the positive electrode active material composition is exemplified by an alcohol solvent, a glycol solvent, a cellosolve solvent, an aminoalcohol solvent, an amine solvent, a ketone solvent, a carboxylic amide solvent, an amide phosphate solvent, a sulfoxide solvent, a carboxylate ester solvent, a phosphate ester solvent, an ether solvent, a nitrile solvent and water. More specifically, the solvent is exemplified by ethanol, N-methylpyrrolidone, acetone, methyl ethyl ketone, dimethylformamide, diethylformamide, dimethylacetamide, diethylacetamide, hexamethylphosphoric triamide, dimethylsulfoxide, ethyl acetate and tetrahydrofuran. Two or more solvents may be used in combination. An amount of the solvent to be used is not particularly limited and may be appropriately adjusted depending on a production method and a raw material to be used.

2-2. Negative Electrode

The negative electrode is prepared by supporting the negative electrode compound composition which contains a negative electrode active material and a binder and which contains a conductive auxiliary agent if necessary on a negative electrode collector. The negative electrode is generally formed into a sheet.

As a method for preparing the negative electrode, a similar method to the method for preparing the positive electrode can be applied. The conductive auxiliary agent, binder and solvent for dispersing the materials which are used for preparing the positive electrode can be similarly used for preparing the negative electrode.

2-2-1. Negative Electrode Collector

As the raw material of the negative electrode collector, an electrically-conductive metal such as copper, iron, nickel, silver, stainless steel, i.e. 'SUS', and the like can be used, and copper is preferred, since copper can be readily formed into a thin film.

2-2-2. Negative Electrode Active Material

The negative electrode active material can store and discharge a lithium ion, and a negative electrode active material which is conventionally known for a lithium ion secondary battery can be used. Specifically, a carbon material, for example, a graphite material such as synthetic graphite and natural graphite, a mesophase calcined body produced from coal or petroleum pitch, hardly graphitizable carbon; a Si negative electrode material such as Si, Si alloy and SiO; a Sn negative electrode material such as Sn alloy; lithium metal; lithium alloy such as lithium-aluminum alloy can be used.

An amount of the negative electrode active material to be used is preferably not less than 80 parts by mass and not more than 99 parts by mass, and more preferably not less than 90 parts by mass and not more than 99 parts by mass, to 100 parts by mass of the total negative electrode compound composition.

2-3. Separator

The separator is placed to separate the positive electrode from the negative electrode. The separator is not particularly restricted, and any separators which are conventionally known can be used in the present invention. Specifically, the separator is exemplified by a porous sheet made from a polymer which can absorb and store the non-aqueous electrolyte solution, such as polyolefin fine porous separator and cellulose separator; a non-woven fabric separator; a porous metallic body. Among the above examples, polyolefin fine porous separator is preferred, since polyolefin fine porous separator is chemically stable to an organic solvent.

A material for the above-described porous sheet is exemplified by polyethylene, polypropylene, and a laminated element having a 3-layered structure of polypropylene/polyethylene/polypropylene.

A material for the above-described non-woven fabric separator is exemplified by cotton, rayon, acetate, nylon, polyester, polypropylene, polyethylene, polyimide, aramid and glass. Depending on required mechanical strength or the like, one of the above-described materials may be used alone, or two or more above-described materials may be used in combination.

2-4. Cell Exterior Material

A cell element having the positive electrode, negative electrode, separator, electrolyte solution and others may be contained in a cell exterior material in order to protect the cell element from external shock, environmental deterioration or the like. The raw material of the cell exterior material is not particularly restricted, and any exterior materials which is conventionally known can be used.

The present application claims the benefit of the priority dates of Japanese patent application No. 2013-29274 filed on Feb. 18, 2013, and Japanese patent application No. 2013-188802 filed on Sep. 11, 2013.

All of the contents of the Japanese patent application No. 2013-29274 filed on Feb. 18, 2013, and Japanese patent application No. 2013-188802 filed on Sep. 11, 2013, are incorporated by reference herein.

EXAMPLES

Hereinafter, the present invention is described in detail with Examples. However, the present invention is not limited to the following Examples in any way, and it is possible to carry out the present invention according to the Examples with an additional appropriate change within the range of the above descriptions and the following descriptions. Such a change is also included in the technical scope of the present invention.

Experimental Example A

Experimental Example 1

1. Preparation of Electrolyte Solution

In a non-aqueous solvent obtained by mixing EC:ethylene carbonate which is one of cyclic carbonates with EMC:ethyl methyl carbonate in a volume ratio of 15:85, $LiPF_6$:lithium hexafluorophosphate manufactured by KISHIDA CHEMICAL Co., Ltd. is dissolved as Electrolyte salt (2) in a concentration of 1.20 mol/L in order to prepare Electrolyte solution (1).

2. Production of Coin-Type Lithium Ion Secondary Battery $LiNi_{1/3}Co_{1/3}Mn_{1/3}O_2$ as a positive-electrode active material, a mixture of 2 parts by mass of acetylene black and 2 parts by mass of graphite as a conductive auxiliary agent, and PVdF as a binder were mixed in a mass ratio of 93:4:3. The mixture was dispersed in N-methylpyrrolidone as a solvent in order to obtain a positive electrode compound composition slurry. An aluminum foil as a positive electrode collector was covered with the slurry. The covered foil was dried in order to obtain a positive electrode sheet.

Spherical-processed natural graphite as a negative electrode active material, carbon black as a conductive auxiliary agent and a mixture of 2.0 parts by mass of styrene-butadiene rubber and 1.2 parts by mass of carboxymethylcellulose as a binder were mixed in a mass ratio of 96.3: 0.5:3.2 to obtain a negative electrode compound composition slurry. A copper foil as a negative electrode collector was covered with the slurry. The covered foil was dried in order to obtain a negative electrode sheet.

Then, the thus obtained positive electrode sheet, negative electrode sheet and a polyethylene separator were punched into circular forms. The diameter of the positive electrode was φ 12 mm, the diameter of the negative electrode was φ 14 mm, and the diameter of the separator was φ 16 mm. The parts for CR2032 coin-type cell were purchased from Hohsen Corp., which parts contained a positive electrode case made of aluminum clad SUS304L, a negative electrode cap made of SUS316L, a spacer having a thickness of 1 mm and made of SUS316L, a wave washer made of SUS316L and a gasket made of polypropylene, and were used to produce a coin-type lithium ion secondary battery. Specifically, the negative electrode cap equipped with the gasket, wave washer, spacer, negative electrode sheet and separator were laminated in this order. The copper foil side of the negative electrode was opposed to the spacer. Then, the laminated element was immersed in the above-described Electrolyte solution (1). Next, the positive electrode sheet was placed so that the side on which the positive electrode compound composition was applied was opposed to the negative electrode active material layer side. The positive electrode case was placed on the positive electrode. The thus obtained body was caulked using a caulking machine to produce a coin-type lithium ion secondary battery.

3. Cycle Characteristics Test

With respect to the produced coin-type lithium ion secondary battery, cycle characteristics test was carried out using a charge/discharge test device manufactured by ASKA ELECTRONIC CO., LTD. under a circumstance of 25° C. The cycle characteristics test was carried out in the prescribed charge condition of 1 C, 4.4 V, constant voltage and constant current mode 0.02 C cut and in the discharge condition of 1 C, end voltage: 2.75 V and constant current mode. Between each charge and discharge, rest time in which charge/discharge was not carried out was set for 10 minutes. Retention capacity rate was calculated from the discharge capacity after 1 cycle and the discharge capacity after 150 cycles. The result is demonstrated in Table 1.

Retention capacity rate (%)=[(discharge capacity after 150 cycles)/(discharge capacity after 1 cycle)]×100

4. Discharge Rate Characteristics Test

Figure 1:
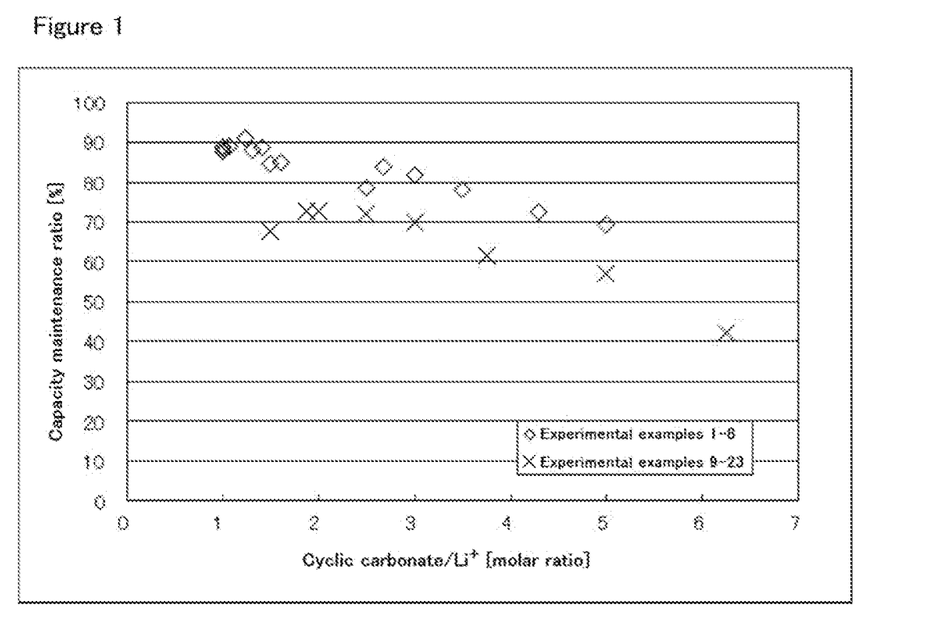
FIG. 1 is a graph which demonstrates the result of Experimental example A.

With respect to the coin-type lithium ion secondary battery, discharge capacity was measured using a charge/discharge test device manufactured by ASKA ELECTRONIC CO., LTD. under a circumstance of 25° C. In order to measure the discharge capacity of the cell, after the charge in the prescribed charge condition of 1 C, 4.4 V, constant voltage and constant current mode 0.02 C cut, constant current discharge was carried out in the conditions of discharge end voltage of 2.75 V and discharge current of 0.2 C. Then, after charge was carried out again in the prescribed charge condition of 1 C, 4.4 V, constant voltage and constant current mode 0.02 C cut, constant current discharge was carried out in the conditions of discharge end voltage of 2.75 V and discharge current of 3 C in order to measure the discharge capacity. During each charge and discharge to measure the discharge capacity, rest time in which charge/discharge was not carried out was set for 10 minutes. The Discharge rate characteristics were calculated as the index of the discharge capacity at the discharge constant current of 3 C on the basis of the discharge capacity at the discharge constant current of 0.2 C as 100, and is described in Table 1 and FIG. 1.

In addition, average discharge voltage was measured at the first discharge. The average discharge voltage means a voltage after passing 150 minutes from the start of discharge when discharge was carried out with 0.2 C from a fully charged condition. The average discharge voltage of the lithium ion secondary battery produced in Example 1 was 3.735 V.

Experimental Examples 2 to 23

Non-aqueous solvents of which compositions are described in the following Table 1 were prepared. Each electrolyte salt was dissolved in the non-aqueous solvent to prepare electrolyte solutions (2) to (23). Coin-type lithium ion secondary batteries were produced in a similar condition to Experimental example 1 except that the thus obtained electrolyte solutions (2) to (23) were used, and cycle characteristics test and discharge rate characteristics test were carried out. In the cycle characteristics test of Experimental examples 20 to 23, the charge condition of 4.4 V in Experimental example 1 was changed to 4.2 V. The results are described in Table 1 and FIG. 1.

In addition, the average discharge voltages were measured at the first discharge in the discharge rate characteristics test similarly to Experimental example 1. The results are described in Table 1. The average discharge voltages of the lithium ion secondary batteries produced in Experimental examples 2 to 23 were 3.7 V or more.

istics deterioration was insufficient, though cycle characteristics were suppressed to a certain extent when the concentration of electrolyte salt was high as Experimental example 8 wherein electrolyte salt concentration was 1.0 mol/L and cycle characteristics were 70.1% and Experimental examples 1 to 7 wherein electrolyte salt concentrations were 1.2 mol/L to 1.5 mol/L and cycle characteristics were 42.2% to 72.6%.

On the one hand, cycle characteristics deterioration was suppressed in a high electrolyte salt concentration region of more than 1.1 mol/L in the cases of Experimental examples 9 to 19 wherein Electrolyte salt (1) was contained in the electrolyte solution in comparison with Experimental examples 1 to 8. In addition, it was observed that the amount of the electrolyte solution was decreased after the cycle characteristics test in Experimental example 5; however, decrease of the amount of the electrolyte solution after cycle characteristics test was not observed in Experimental example 15 which had a similar electrolyte solution composition to Experimental example 5 except that Electrolyte salt (1) was used.

From the above-described results, it is considered reasonable that a coating layer may be formed on the surface of a positive electrode and/or negative electrode by using Electrolyte salt (1); as a result, cycle characteristics deterioration may be suppressed by preventing oxidative decomposition and reductive decomposition of the solvent.

In particular, it was found from the results of Experimental examples 9 to 19 that when the concentrations of electrolyte salt in electrolyte solutions were the same, cycle characteristics were better as the molar ratio of cyclic carbonate to lithium ion, i.e. cyclic carbonate/$Li^+$, was smaller by the comparison of Experimental examples 9 and 10, the comparison of Experimental examples 11 to 13, and the comparison Experimental examples 14 to 17.

The above results may be provided because decomposition reaction of the solvent was further suppressed by the following reasons:

TABLE 1

| | Electrolyte salt (1) [mol/L] | | Other electrolyte salt [mol/L] | | Cyclic carbonate [vol %] | | Other solvent [vol %] | | Cyclic carbonate/$Li^+$ [molar ratio] | Retention capacity rate after 150 cycles [%] | Load characteristics 3 C/0.2 C [%] | Average discharge voltage [V] |
|---|---|---|---|---|---|---|---|---|---|---|---|---|
| Experimental Example 1 | — | | $LiPF_6$ | 1.20 | EC | 15 | EMC | 85 | 1.88 | 72.6 | 90.5 | 3.735 |
| Experimental Example 2 | — | | $LiPF_6$ | 1.20 | EC | 20 | EMC | 80 | 2.50 | 72.2 | 89.9 | 3.742 |
| Experimental Example 3 | — | | $LiPF_6$ | 1.20 | EC | 30 | EMC | 70 | 3.75 | 61.6 | 89.0 | 3.728 |
| Experimental Example 4 | — | | $LiPF_6$ | 1.20 | EC | 50 | EMC | 50 | 6.25 | 42.2 | 87.7 | 3.734 |
| Experimental Example 5 | — | | $LiPF_6$ | 1.50 | EC | 15 | EMC | 85 | 1.50 | 67.7 | 89.0 | 3.733 |
| Experimental Example 6 | — | | $LiPF_6$ | 1.50 | EC | 20 | EMC | 80 | 2.00 | 72.6 | 89.0 | 3.741 |
| Experimental Example 7 | — | | $LiPF_6$ | 1.50 | EC | 50 | EMC | 50 | 5.00 | 57.1 | 82.9 | 3.744 |
| Experimental Example 8 | — | | $LiPF_6$ | 1.00 | EC | 20 | EMC | 80 | 3.00 | 70.1 | 90.1 | 3.734 |
| Experimental Example 9 | LiFSI | 0.20 | $LiPF_6$ | 1.00 | EC | 20 | EMC | 80 | 2.50 | 78.6 | 90.0 | 3.732 |
| Experimental Example 10 | LiFSI | 0.20 | $LiPF_6$ | 1.00 | EC | 40 | EMC | 60 | 5.00 | 69.2 | 89.8 | 3.728 |
| Experimental Example 11 | LiFSI | 0.40 | $LiPF_6$ | 1.00 | EC | 15 | EMC | 85 | 1.61 | 84.9 | 90.3 | 3.742 |
| Experimental Example 12 | LiFSI | 0.40 | $LiPF_6$ | 1.00 | EC | 25 | EMC | 75 | 2.68 | 83.9 | 89.9 | 3.728 |
| Experimental Example 13 | LiFSI | 0.40 | $LiPF_6$ | 1.00 | EC | 40 | EMC | 60 | 4.29 | 72.5 | 89.8 | 3.736 |
| Experimental Example 14 | LiFSI | 0.50 | $LiPF_6$ | 1.00 | EC | 10 | EMC | 90 | 1.00 | 88.9 | 89.8 | 3.735 |
| Experimental Example 15 | LiFSI | 0.50 | $LiPF_6$ | 1.00 | EC | 15 | EMC | 85 | 1.50 | 84.7 | 90.4 | 3.730 |
| Experimental Example 16 | LiFSI | 0.50 | $LiPF_6$ | 1.00 | EC | 30 | EMC | 70 | 3.00 | 81.9 | 89.1 | 3.728 |
| Experimental Example 17 | LiFSI | 0.50 | $LiPF_6$ | 1.00 | EC | 35 | EMC | 65 | 3.50 | 78.0 | 89.4 | 3.740 |
| Experimental Example 18 | LiFSI | 0.60 | $LiPF_6$ | 1.00 | EC | 15 | EMC | 85 | 1.41 | 88.8 | 90.7 | 3.736 |
| Experimental Example 19 | LiFSI | 0.70 | $LiPF_6$ | 1.00 | EC | 15 | EMC | 85 | 1.32 | 87.9 | 90.7 | 3.733 |
| Experimental Example 20 | LiFSI | 0.80 | $LiPF_6$ | 0.40 | EC | 8 | EMC | 92 | 1.00 | 88.3 | 90.2 | 3.741 |
| Experimental Example 21 | LiFSI | 0.70 | $LiPF_6$ | 0.50 | EC | 8 | EMC | 92 | 1.00 | 87.5 | 89.1 | 3.735 |
| Experimental Example 22 | LiFSI | 1.00 | $LiPF_6$ | 0.20 | EC | 10 | EMC | 90 | 1.25 | 91.1 | 90.4 | 3.733 |
| Experimental Example 23 | LiFSI | 1.20 | $LiPF_6$ | 0.20 | EC | 10 | EMC | 90 | 1.07 | 89.1 | 90.6 | 3.742 |

In Table 1, "LiFSI" represents lithium bis(fluorosulfonyl)imide.

As the results in Table 1, when only $LiPF_6$ was used as an electrolyte salt, the suppression degree of cycle charactera coating layer was formed on the electrode surface; and additionally an amount of the cyclic carbonate which did not solvate to a lithium ion and which could be involved in the decomposition reaction was decreased due to solvation of the cyclic carbonate as a solvent to a lithium ion by using the cyclic carbonate in the specific amount range.

It was found from the results of Experimental examples 20 to 23 that cycle characteristics were better as the molar ratio of cyclic carbonate to lithium ion, i.e. cyclic carbonate/Li$^+$, was smaller in the case of the electrolyte solution in which Electrolyte salt (1) was used as a main component, in other words, in a concentration of about 58% or more in the all electrolyte salts.

As similarly to Experimental examples 9 to 19, the above result may be provided because decomposition reaction of the solvent was further suppressed in Experimental examples 20 to 23 by the following reasons:

a coating layer was formed on the electrode surface; and additionally an amount of the cyclic carbonate which did not solvate to a lithium ion and which could be involved in the decomposition reaction was decreased due to solvation of the cyclic carbonate to a lithium ion by using the cyclic carbonate in the specific amount range.

As the above results, when the electrolyte solution of the present invention, which contains Electrolyte salt (1) and a cyclic carbonate and in which the electrolyte salt is high as more than 1.1 mol/L, is used, the above effects can be obtained regardless of the end voltage during charge. In addition, it is expected that rate characteristics at low temperature are also improved by using LiFSI as the main Electrolyte salt (1).

With respect to discharge rate characteristics, it was found that when Electrolyte salt (1) was not used, discharge rate characteristics tended to deteriorate as an electrolyte salt concentration was higher even if solvent compositions were the same according to the comparison between Experimental examples 2 and 6, and between Experimental examples 4 and 7. On the one hand, when Electrolyte salt (1) was used, discharge rate characteristics were not remarkably changed in the same solvent compositions even if an electrolyte salt concentration was higher. The above results may be provided because the viscosity was not increased in the present invention Examples wherein Electrolyte salt (1) was used even if an electrolyte salt concentration was increased, since the solubility of Electrolyte salt (1) in a solvent was higher in comparison with LiPF$_6$ as the other electrolyte salt. In addition, it may contribute to an improvement of discharge rate characteristics that the ion conductivity of Electrolyte salt (1) is superior to LiPF$_6$ as the other electrolyte salt.

From the above-described results, it can be expected that the lithium ion secondary battery having the electrolyte solution of the present invention has a long lifetime since deterioration of cycle characteristics is suppressed.

Experimental Example B

Experimental Example 24

1. Preparation of Electrolyte Solution

A non-aqueous solvent was prepared by mixing EC:ethylene carbonate as a cyclic carbonate and EMC:ethyl methyl carbonate in a volume ratio of 10:90. In the non-aqueous solvent, lithium bis(fluorosulfonyl)imide as Electrolyte salt (1) and LiPF$_6$:lithium hexafluorophosphate manufactured by KISHIDA CHEMICAL Co., Ltd. as Electrolyte salt (2) were respectively dissolved in a concentration of 0.6 mol/L to obtain electrolyte solution (24).

2. Preparation of Laminate-Type Lithium Ion Secondary Battery and Charge/Discharge Before Test One commercially available positive electrode sheet of which active material was LiNi$_{1/3}$Co$_{1/3}$Mn$_{1/3}$O$_2$ and one commercially available negative electrode sheet of which active material was graphite were laminated to face each other, and one polyolefin separator was placed between the electrode sheets. The positive electrode sheet and negative electrode sheet were held by two aluminum laminate films. The inside of the aluminum laminate films was filled with the electrolyte solution and sealed in a vacuum state to prepare a 24 mAh laminate cell.

After charge and discharge were carried out one time using a charge/discharge test device ("ACD-01" manufactured by ASKA ELECTRONIC CO., LTD.) at 25° C. in a charge/discharge rate of 0.2 C in a constant current mode at 3.0 V to 4.2 V, the seal of the laminate cell was broken. Then, the cell was sealed again in a vacuum state. The laminate-type lithium ion secondary battery was completed by repeating charge and discharge five times in the same conditions.

3. Cycle Characteristics Test

Charge/Discharge Efficiency

With respect to the thus obtained laminate-type lithium ion secondary battery, cycle characteristics test was carried out using a charge/discharge test device ("ACD-01" manufactured by ASKA ELECTRONIC CO., LTD.) at 25° C. in a charge/discharge rate of 0.2 C and in a condition of constant current and constant voltage mode 0.02 C cut at 3.0 V to 4.2 V. In the cycle characteristics test, rest time in which charge/discharge was not carried out was set for 10 minutes between each charge and discharge. A charge/discharge efficiency at the first cycle and the fifth cycle was calculated by the following formula. The results are described in Table 2.

Charge/discharge efficiency (%)=100×[(discharge capacity)/(charge capacity)]

4. Low-Temperature Characteristics

Discharge Rate Characteristics

With respect to the laminate-type lithium ion secondary battery, after the charge to 4.2 V using a charge/discharge test device ("ACD-01" manufactured by ASKA ELECTRONIC CO., LTD.) at 25° C. in a charge rate of 0.2 C and in a condition of constant current and constant voltage mode 0.02 C cut, a discharge capacity at the time of discharge to 3 V in a discharge rate of 0.2 C and in a condition of constant current mode was obtained as a standard. Then, after charge in the same condition, a discharge rate was changed to 0.2 C, 0.5 C, 1.0 C or 2.0 C at −30° C., and a discharge capacity was measured at the time of discharge to 3.0 V. The results are described in Table 2.

Experimental Examples 25 to 27

Each electrolyte salt was dissolved in a solvent as the compositions described in the following Table 2 to prepare electrolyte solutions (25) to (27). Laminate-type lithium ion secondary batteries were produced in a similar condition to Experimental examples 24 except that the thus obtained electrolyte solutions (25) to (27) were used, and cycle characteristics test and low-temperature characteristics test were carried out. The results are described in Table 2.

TABLE 2

|  | Experimental Example 24 | Experimental Example 25 | Experimental Example 26 | Experimental Example 27 |
|---|---|---|---|---|
| Electrolyte salt (1) [mol/L] | LiFSI 0.6 | — | LiFSI 0.6 | — |
| Other electrolyte salt [mol/L] | $LiPF_6$ 0.6 | $LiPF_6$ 1.2 | $LiPF_6$ 0.6 | $LiPF_6$ 1.2 |
| Cyclic carbonate [vol %] | EC 10 | EC 10 | EC 0 | EC 0 |
| Other solvent [vol %] | EMC 90 | EMC 90 | EMC 100 | EMC 100 |
| Cyclic carbonate/Li* [molar ratio] | 1.25 | 1.25 | 0 | 0 |
| Discharge capacity [mAh] | 24.1 | 21.8 | 19.9 | 18.1 |
| Charge/discharge efficiency $1^{st}$ cycle | 98.8 | 99.1 | 95.6 | 95.5 |
| Charge/discharge efficiency $5^{th}$ cycle | 99.5 | 99.6 | 98.7 | 98.7 |
| Discharge rate characteristics (25° C.) 0.2 C | 19.9 | 17.2 | 17.9 | 15.8 |
| Discharge rate characteristics (25° C.) 0.5 C | 18.1 | 15.4 | 16.8 | 15.0 |
| Discharge rate characteristics (25° C.) 1 C | 15.5 | 12.1 | 13.8 | 10.9 |
| Discharge rate characteristics (25° C.) 2 C | 8.1 | 5.5 | 5.5 | 5.0 |
| Average discharge voltage [V] | 3.736 | 3.734 | 3.731 | 3.728 |

As Table 2, the laminate-type lithium ion secondary battery of Experimental example 24 of which cyclic carbonate/$Li^+$ ratio was 1.25 exhibited high charge/discharge efficiency in the cycle characteristics test to measure charge/discharge efficiency. On the one hand, Experimental example 26 of which cyclic carbonate/$Li^+$ ratio was 0 due to no cyclic carbonate was inferior to Experimental example 24 in the charge/discharge efficiencies at the first cycle and fifth cycle. It was confirmed from the results that the capacity of a lithium ion secondary battery can be increased by adding Electrolyte salt (1) even in the same solvent compositions. In addition, when Experimental example 24 and Experimental example 26 were compared, the discharge capacity of Experimental example 24 was also larger.

The above results may be provided because the decomposition of the solvent was accelerated in Experimental example 26 in comparison with Experimental example 24 in which the electrolyte solution containing cyclic carbonate was used, since a cyclic carbonate was not contained in the solvent of Experimental example 26 and a coating layer was not formed on the negative electrode. When Experimental examples 24 and 25 were compared, the discharge capacity of Experimental example 24 which contained Electrolyte salt (1) was larger. This results may be provided because the decomposition of the solvent was inhibited by forming a coating layer on the electrode surface due to Electrolyte salt (1) in addition to cyclic carbonate.

In the low-temperature characteristics test to evaluate discharge rate characteristics, Experimental example 24 of which cyclic carbonate/$Li^+$ ratio was 1.25 exhibited the highest discharge capacity at any discharge rate in comparison with the other Experimental examples. On the one hand, Experimental example 26 of which cyclic carbonate/$Li^+$ ratio was 0 due to no cyclic carbonate exhibited lower discharge capacity at any discharge rate in comparison with Experimental example 24. In addition, Experimental examples 25 and 27 which did not contain LiFSI as Electrolyte salt (1) were inferior to Experimental example 24 which contained Electrolyte salt (1) in discharge rate characteristics.

With respect to the lithium ion secondary batteries produced in Experimental examples 24 to 27, all of the average discharge voltages measured at the first discharge in the low-temperature characteristics test were 3.7 V or more. The average discharge voltage meant a voltage after passing 150 minutes from the start of discharge when discharge was carried out with 0.2 C from a fully charged condition. The measurement results were described in Table 2.

Experimental Example C

Experimental Example 28

1. Preparation of Electrolyte Solution

A non-aqueous solvent was prepared by mixing EC:ethylene carbonate as a cyclic carbonate and EMC:ethyl methyl carbonate in a composition described in Table 3. In the non-aqueous solvent, lithium(fluorosulfonyl)(trifluoromethylsulfonyl)imide as Electrolyte salt (1) and $LiPF_6$:lithium hexafluorophosphate manufactured by KISHIDA CHEMICAL Co., Ltd. as Electrolyte salt (2) were dissolved in a concentration described in Table 3 to prepare each electrolyte solution. In Table 3, "LiFTI" represents lithium(fluorosulfonyl)(trifluoromethylsulfonyl)imide.

2. Production of Coin-Type Lithium Ion Secondary Battery

A commercially available positive electrode sheet ($LiCoO_2$), a commercially available negative electrode sheet (natural graphite) and a polyethylene separator were punched into circular forms. The diameter of the positive electrode was φ 12 mm, the diameter of the negative electrode was φ 14 mm, and the diameter of the separator was φ 16 mm. The parts for CR2032 coin cell purchased from Hohsen Corp., which parts contained a positive electrode case made of aluminum clad SUS304L, a negative electrode cap made of SUS316L, a spacer having a thickness of 1 mm and made of SUS316L, a wave washer made of SUS316L and a gasket made of polypropylene, were used to produce a coin-type lithium ion secondary battery.

Specifically, the negative electrode cap equipped with the gasket, wave washer, spacer, negative electrode sheet and separator were laminated in this order. The copper foil side of the negative electrode was opposed to the spacer. Then, the laminated element was immersed in the electrolyte solution having the composition described in Table 3. Next, the positive electrode sheet was placed so that the layer in which the positive electrode active material ($LiCoO_2$) was contained was opposed to the negative electrode active material layer side. The positive electrode case was placed on the positive electrode. The thus obtained body was caulked using a caulking machine to produce a coin-type lithium ion secondary battery.

3. Cycle Characteristics Test

Figure 2:
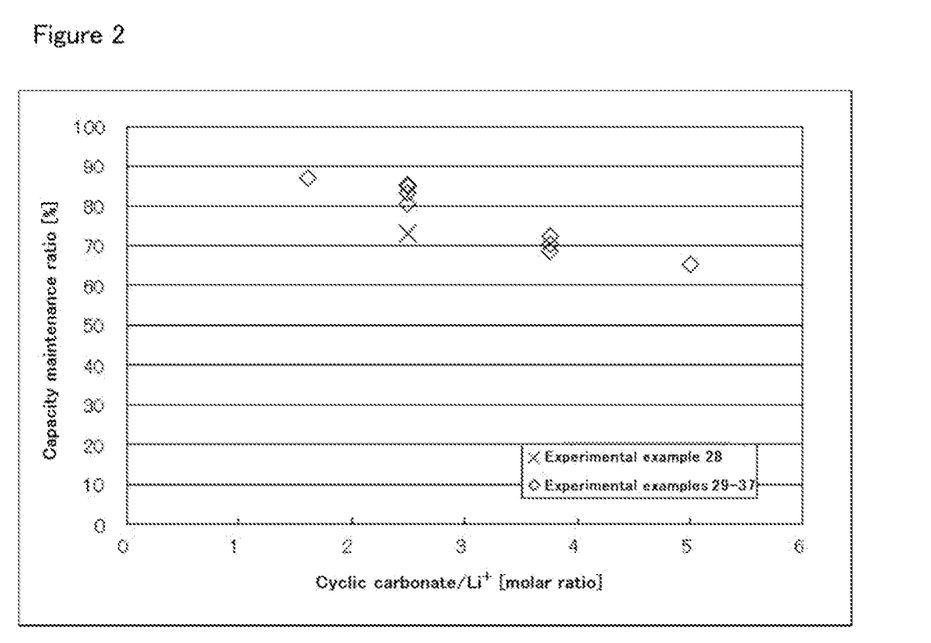
FIG. 2 is a graph which demonstrates the result of Experimental example C.

With respect to the produced coin-type lithium ion secondary battery, cycle characteristics test was carried out using a charge/discharge test device ("ACD-01" manufactured by ASKA ELECTRONIC CO., LTD.) under a circumstance of 25° C. The cycle characteristics test was carried out in the prescribed charge condition of 1 C, 4.2 V, constant voltage and constant current mode 0.02 C cut and in the prescribed discharge condition of 1 C, end voltage: 3 V and constant current mode. Between each charge and discharge, rest time in which charge/discharge was not carried out was set for 10 minutes. The value of retention capacity rate was calculated from the values of the discharge capacity after 1 cycle and the discharge capacity after 100 cycles. The results are demonstrated in Table 3 and FIG. 2.

Retention capacity rate (%)=[(discharge capacity after 100 cycles)/(discharge capacity after 1 cycle)]×100

TABLE 3

| | Electrolyte salt (1) [mol/L] | | Other electrolyte salt [mol/L] | | Cyclic carbonate [vol %] | | Other solvent [vol %] | | Cyclic carbonate/$Li^+$ [molar ratio] | Retention capacity rate after 100 cycle [%] |
|---|---|---|---|---|---|---|---|---|---|---|
| Experimental Example 28 | — | | $LiPF_6$ | 1.2 | EC | 20 | EMC | 80 | 2.5 | 73.2 |
| Experimental Example 29 | LiFTI | 0.2 | $LiPF_6$ | 1.0 | EC | 20 | EMC | 80 | 2.5 | 80.4 |
| Experimental Example 30 | LiFTI | 0.4 | $LiPF_6$ | 0.8 | EC | 20 | EMC | 80 | 2.5 | 83.2 |
| Experimental Example 31 | LiFTI | 0.6 | $LiPF_6$ | 0.6 | EC | 20 | EMC | 80 | 2.5 | 84.8 |
| Experimental Example 32 | LiFTI | 0.4 | $LiPF_6$ | 1.0 | EC | 15 | EMC | 85 | 1.61 | 86.9 |
| Experimental Example 33 | LiFTI | 0.2 | $LiPF_6$ | 1.0 | EC | 30 | EMC | 70 | 3.75 | 72.4 |
| Experimental Example 34 | LiFTI | 0.4 | $LiPF_6$ | 0.8 | EC | 30 | EMC | 70 | 3.75 | 70.3 |
| Experimental Example 35 | LiFTI | 0.4 | $LiPF_6$ | 0.8 | EC | 40 | EMC | 60 | 5 | 65.2 |
| Experimental Example 36 | LiFTI | 0.8 | $LiPF_6$ | 0.4 | EC | 20 | EMC | 80 | 2.5 | 85.3 |
| Experimental Example 37 | LiFTI | 0.8 | $LiPF_6$ | 0.4 | EC | 30 | EMC | 70 | 3.75 | 68.5 |

It was found from the above-described Experimental examples that when LiFTI was used as Electrolyte salt (1), the deterioration of cycle characteristics tended to be suppressed as the molar ratio of cyclic carbonate to lithium ion, i.e. cyclic carbonate/$Li^+$, was smaller similarly to the case of using LiFSI. In addition, it was found by the comparison of Experimental examples 29 and 33, Experimental examples 30 to 34 and Experimental examples 36 to 37 that though cycle characteristics tended to deteriorate as the concentration of Electrolyte salt (1) became higher, the deterioration of cycle characteristics could be inhibited by decreasing cyclic carbonate/$Li^+$, particularly to 3 or less, even when the electrolyte salt concentration in electrolyte solution was high.

The invention claimed is:

1. An electrolyte solution, comprising an electrolyte salt and a solvent, wherein a total concentration of the electrolyte salt is more than 1.1 mol/L and 1.9 mol/L or less, the electrolyte salt contains a compound represented by the following formula (1) and another electrolyte salt:

$$(FSO_2)(FSO_2)NLi \quad (1)$$

the solvent contains a cyclic carbonate,
a concentration of the compound of formula (1) is in the electrolyte solution is not less than 0.2 mol/L,
a concentration of the another electrolyte salt in the electrolyte solution is 1.4 mol/L or less, and
a molar ratio of the cyclic carbonate to the total lithium ion in the electrolyte solution is not less than 1 and not more than 1.8,
wherein:
the solvent contains at least one selected from the group consisting of a saturated cyclic carbonate and a cyclic carbonate having an unsaturated bond;
the saturated cyclic carbonate consists of at least one selected from the group consisting of ethylene carbonate, propylene carbonate, 2,3-dimethylethylene carbonate, 1,2-butylene carbonate and erythritan carbonate;
the cyclic carbonate having a unsaturated bond is at least one selected from the group consisting of vinylene carbonate, methylvinylene carbonate, ethylvinylene carbonate, 2-vinylethylene carbonate and phenylethylene carbonate;
the solvent contains a solvent other than the cyclic carbonate; and
the solvent other than the cyclic carbonate is at least one selected from the group consisting of methyl carbonate, ethyl methyl carbonate, diethyl carbonate, γ-butyrolactone and γ-valerolactone.

2. The electrolyte solution according to claim 1, further comprising at least one compound selected from the group consisting of a compound represented by the following formula (2), a compound represented by the following formula (3) and lithium hexafluoroarsenate as the electrolyte salt, $$LiPF_a(C_mF_{2m+1})_{6-a} (0<a<6, 1<m<4) \quad (2)$$

$$LiBF_b(C_nF_{2n+1})_{4-b} (1<b<4, 1<n<4) \quad (3).$$

3. A lithium ion secondary battery, comprising the electrolyte solution according to claim 1.

4. The lithium ion secondary battery according to claim 3, wherein an average discharge voltage is not less than 3.7 V.

5. The electrolyte solution according to claim 1, wherein the concentration of the electrolyte salt is not less than 1.3 mol/L.

6. An electrolyte solution for secondary battery, comprising an electrolyte salt and a solvent,
wherein a total concentration of the electrolyte salt is more than 1.1 mol/L and 1.9 mol/L or less,
the electrolyte salt contains a compound represented by the following formula (1) and another electrolyte salt:

(FSO₂)(FSO₂)NLi     (1)

the solvent contains one or more cyclic carbonates,
a concentration of the compound of formula (1) is in the electrolyte solution is not less than 0.2 mol/L,
a concentration of the another electrolyte salt is 1.4 mol/L or less, and
a molar ratio of the one or more cyclic carbonates contained in the electrolyte solution to the total lithium ion in the electrolyte solution is not less than 1 and not more than 1.8,
wherein:
the solvent contains at least one selected from the group consisting of a saturated cyclic carbonate and a cyclic carbonate having an unsaturated bond;
the saturated cyclic carbonate consists of at least one selected from the group consisting of ethylene carbonate, propylene carbonate, 2,3-dimethylethylene carbonate, 1,2-butylene carbonate and erythritan carbonate;
the cyclic carbonate having a unsaturated bond is at least one selected from the group consisting of vinylene carbonate, methylvinylene carbonate, ethylvinylene carbonate, 2-vinylethylene carbonate and phenylethylene carbonate;
the solvent contains a solvent other than the cyclic carbonate; and
the solvent other than the cyclic carbonate is at least one selected from the group consisting of methyl carbonate, ethyl methyl carbonate, diethyl carbonate, γ-butyrolactone and γ-valerolactone.

7. The electrolyte solution for secondary battery according to claim 6, wherein the molar ratio of the one or more cyclic carbonates contained in the electrolyte solution to the total lithium ion in the electrolyte solution is 2.5 or less.

8. The electrolyte solution for secondary battery according to claim 6, wherein the molar ratio of the one or more cyclic carbonates contained in the electrolyte solution to the total lithium ion in the electrolyte solution is 2.0 or less.

9. The electrolyte solution for secondary battery according to claim 6, wherein the cyclic carbonate is a saturated cyclic carbonate.

10. The electrolyte solution for secondary battery according to claim 6, wherein the total concentration of the electrolyte salt is not less than 1.3 mol/L.

* * * * *